United States Patent
Lee et al.

(10) Patent No.: US 10,908,728 B2
(45) Date of Patent: Feb. 2, 2021

(54) TOUCH DISPLAY DEVICE AND METHOD OF DRIVING THE SAME

(71) Applicant: LG Display Co., Ltd., Seoul (KR)

(72) Inventors: Tae-Ho Lee, Paju-si (KR); Sang-Ho Lee, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 141 days.

(21) Appl. No.: 16/228,070

(22) Filed: Dec. 20, 2018

(65) Prior Publication Data
US 2019/0204981 A1 Jul. 4, 2019

(30) Foreign Application Priority Data

Dec. 28, 2017 (KR) ........................ 10-2017-0182253

(51) Int. Cl.
| | |
|---|---|
| *G06F 3/041* | (2006.01) |
| *G09G 3/36* | (2006.01) |
| *G09G 3/3266* | (2016.01) |
| *G09G 3/3275* | (2016.01) |

(52) U.S. Cl.
CPC .......... *G06F 3/0416* (2013.01); *G06F 3/0412* (2013.01); *G09G 3/3266* (2013.01); *G09G 3/3275* (2013.01); *G09G 3/3677* (2013.01); *G09G 3/3685* (2013.01); *G09G 3/3688* (2013.01); *G09G 2310/0297* (2013.01); *G09G 2310/066* (2013.01); *G09G 2310/08* (2013.01)

(58) Field of Classification Search
CPC ... G06F 3/0416; G06F 3/0412; G09G 3/3688; G09G 3/3677; G09G 3/3685; G09G 3/3266; G09G 3/3275; G09G 2310/066; G09G 2310/0297; G09G 2310/08; G09G 3/3225; G09G 3/3648; G02F 1/13338; H01L 27/323
See application file for complete search history.

(56) References Cited

U.S. PATENT DOCUMENTS

2016/0179275 A1* 6/2016 Lee .................... G06F 3/044
  345/174
2018/0337687 A1* 11/2018 Adjiwibawa ......... H03M 1/662

* cited by examiner

*Primary Examiner* — Jonathan A Boyd
(74) *Attorney, Agent, or Firm* — Seed IP Law Group LLP

(57) ABSTRACT

A touch display device includes: a timing controlling unit generating image data, a data control signal, a gate control signal and a touch synchronization signal by using an image signal and a plurality of timing signals and generating a plurality of MUX clocks having a MUX slew rate and a MUX clock gap; a data driving unit generating a data signal by using the image data and the data control signal; a MUX unit outputting the data signal according to the plurality of MUX clocks in a time division; a gate driving unit generating a gate signal by using the gate control signal; a touch driving unit generating a touch transmitting signal by using the touch synchronization signal; and a touch display panel displaying an image by using the gate signal and the data signal and sensing a touch by using the touch transmitting signal.

9 Claims, 5 Drawing Sheets

TOUCH DISPLAY DEVICE AND METHOD OF DRIVING THE SAME

CROSS REFERENCE TO RELATED APPLICATIONS

The present application claims the priority benefit of Korean Patent Application No. 10-2017-0182253 filed in Republic of Korea on Dec. 28, 2017, which is hereby incorporated by reference in its entirety for all purposes as if fully set forth herein.

BACKGROUND

Technical Field

The present disclosure relates to a touch display device, and more particularly, to a touch display device where a uniformity of a brightness is improved and a deterioration such as a stripe stain is prevented by adjusting a MUX slew rate and a MUX slew gap of a MUX clock and a method of driving the touch display device.

Description of the Related Art

As information communication technology and electronic engineering technology progress, various flat panel displays (FPDs) replacing a conventional cathode ray tube (CRT) have been researched. Specifically, a liquid crystal display (LCD) device, a plasma display panel (PDP) device, an organic light emitting diode (OLED) display device or a field emission display (FED) device having a thin profile, a light weight and a low power consumption as compared with the CRT has been the subject of recent research.

Recently, a touch display device (or a touch screen) where a touch panel is attached to a display panel has been widely used.

The touch display device is used as an output means displaying an image and as an input means receiving a user's order through a touch on a part of the displayed image. The touch panel of the touch display device may be classified into a pressure sensing type, a capacitive type, an infrared type and an ultrasonic type according to a detection method of a position information.

When a user sees an image of the display panel and touches the touch panel, the touch panel detects the position information of the point and recognizes the user's order by comparing the detected position information with a position information of the image.

The touch display device may be fabricated such that an individual touch panel is attached to a display panel. Alternatively, the touch display device may be fabricated such that a touch panel is formed on a substrate of a display panel as an integrated shape.

Recently, for slimness of a portable terminal such as a smart phone and a tablet PC, a demand for an in-cell type touch display device where a touch panel and a display panel are integrated by using an electrode or a line for the display panel as an electrode and a line for a touch panel has increased.

In the in-cell type touch display device, a time period of one frame may be divided into a display period for displaying an image and a touch period for sensing a touch. During the display period, a common voltage is applied to a touch transmitting line and a touch receiving line. During the touch period, a touch transmitting voltage is applied to the touch transmitting line and a voltage of the touch receiving line is read out.

A parasitic capacitance is generated between a gate line and the touch transmitting line and between the gate line and the touch receiving line, and a deviation is generated in the common voltage of the touch transmitting line and the touch receiving line due to a coupling of a gate signal (a gate voltage) through the parasitic capacitance. The deviation in the common voltage causes deterioration such as a stripe stain of a linear shape.

When the gate line and the touch receiving line are disposed along a horizontal direction and the touch transmitting line is disposed along a vertical direction perpendicular to the horizontal direction, a vertical stripe stain is generated due to a coupling through the parasitic capacitance between the gate line and the touch transmitting line and a horizontal stripe stain is generated due to a coupling through the parasitic capacitance between the gate line and the touch receiving line during the display period where the gate signal is applied to the gate line. The stripe stain may be quantified as a vertical stripe feature of merit (VSFOM) which represents a brightness difference of the vertical direction and the horizontal direction.

For example, as an absolute value of the VSFOM increases, the stripe stain becomes clear and deterioration is intensified. In addition, as the VSFOM decreases close to 0, the stripe stain becomes blurred and deterioration is prevented.

The VSFOM may be minimized by adjusting a gate clock gap and a gate slew rate of a gate clock for generating the gate signal supplied to the gate line.

FIG. 1 is a view showing a gate clock of a touch display device according to the related art, FIG. 2 is a view showing a change of a gate slew rate of a gate clock of a touch display device according to the related art, and FIG. 3 is a view showing a vertical stripe feature of merit of a touch display device according to the related art.

In FIG. 1, a gate driving unit of a touch display device according to the related art generates a gate signal by using first and second gate clocks GCLK1 and GCLK2 and supplies the gate signal to a gate line.

Each of the first and second gate clocks GCLK1 and GCLK2 is a square wave having a high level section, and pulses of the first and second gate clocks GCLK1 and GCLK2 have a phase difference of a clock gap CG.

In FIG. 2, each of the first and second gate clocks GCLK1 and GCLK2 may have first to pth gate slew rates GSR1 to GSRp according to a rising time and a falling time. The slew rate may be defined as a ratio of a voltage variation to a time variation.

For example, the first gate slew rate GSR1 of the rising time and the falling time of 0 corresponds to an infinity. As the rising time and the falling time increase, the gate slew rate decreases from the second gate slew rate GSR2 to the pth gate slew rate GSRp.

In FIG. 3, when the gate slew rate of the first and second gate clocks GCLK1 and GCLK2 is not adjusted, a vertical stripe feature of merit (VSFOM) of the touch display device is changed according to a first curve C1. When the touch display device is used for a relatively long time period, the VSFOM of the touch display device is changed according to a second curve C2. When the gate slew rate of the first and second gate clocks GCLK1 and GCLK2 is adjusted, the VSFOM of the touch display device is changed according to a third curve C3.

When the gate slew rate of the first and second gate clocks GCLK1 and GCLK2 is not adjusted, the VSFOM is changed according to the first curve C1 with respect to a gate clock gap GG of the first and second gate clocks GCLK1 and GCLK2. During a change period CP, the VSFOM decreases and then increases as the gate clock gap GG of the first and second gate clocks GCLK1 and GCLK2 increases. During a saturation period SP, the VSFOM is kept constant even when the gate clock gap GG of the first and second gate clocks GCLK1 and GCLK2 increases.

As a result, deterioration such as a stripe stain of the touch display device may be prevented by adjusting the gate clock gap GG of the first and second gate clocks GCLK1 and GCLK2 such that the VSFOM becomes 0 in the change period CP.

However, when the touch display device is used for a relatively long time, the VSFOM is changed according to the second curve C2 with respect to a gate clock gap GG of the first and second gate clocks GCLK1 and GCLK2. Since the gate clock gap GG of the first and second gate clocks GCLK1 and GCLK2 for the VSFOM of 0 in the change period CP is changed, deterioration such as a stripe stain is caused again.

However, in the saturation period SP, the VSFOM is kept constant even when the gate clock gap GG of the first and second gate clocks GCLK1 and GCLK2 increases.

When the gate slew rate of the first and second gate clocks GCLK1 and GCLK2 is adjusted, the VSFOM is changed according to the third curve C3 which is obtained through a parallel movement of the first curve C1 with respect to the gate clock gap GG of the first and second gate clocks GCLK1 and GCLK2. When the gate clock gap GG of the first and second gate clocks GCLK1 and GCLK2 is determined to correspond to the saturation period SP of the third curve C3, the VSFOM may be kept 0 at a beginning of usage and even after usage for a relatively long time. As a result, deterioration such as a stripe stain may be prevented.

The VSFOM may have a positive value during a whole period of gate clock gap GG of the first and second gate clocks GCLK1 and GCLK2 even when the gate slew rate of the first and second gate clocks GCLK1 and GCLK2 is adjusted. The fourth curve C4 may not move in parallel such that the VSFOM of the saturation period SP becomes 0 even by adjustment of the gate clock gap GG or the gate slew rate. As a result, deterioration such as a stripe stain is not prevented.

Specifically, the VSFOM due to the parasitic capacitance between the data line and the touch transmitting line and between the data line and the touch receiving line is not minimized by adjustment of the gate clock gap GG and the gate slew rate of the first and second gate clocks GCLK1 and GCLK2.

BRIEF SUMMARY

Accordingly, the present disclosure is directed to a touch display device and a method of driving the touch display device that substantially obviate one or more of the problems due to limitations and disadvantages of the related art.

An object of the present disclosure is to provide a touch display device where a vertical stripe feature of merit is minimized, a brightness uniformity is improved and deterioration such as a stripe stain is prevented by adjusting a MUX slew rate of a MUX clock and a method of driving the touch display device.

Additional features and advantages of the disclosure will be set forth in the description which follows, and in part will be apparent from the description, or may be learned by practice of the invention. These and other advantages of the disclosure will be realized and attained by the structure particularly pointed out in the written description and claims hereof as well as the appended drawings.

To achieve these and other advantages and in accordance with the purpose of the present invention, as embodied and broadly described herein, a touch display device includes: a timing controlling unit generating image data, a data control signal, a gate control signal and a touch synchronization signal by using an image signal and a plurality of timing signals and generating a plurality of MUX clocks having a MUX slew rate and a MUX clock gap; a data driving unit generating a data signal by using the image data and the data control signal; a MUX unit outputting the data signal according to the plurality of MUX clocks in a time division; a gate driving unit generating a gate signal by using the gate control signal; a touch driving unit generating a touch transmitting signal by using the touch synchronization signal; and a touch display panel displaying an image by using the gate signal and the data signal and sensing a touch by using the touch transmitting signal.

In another aspect, a method of driving a touch display device includes: generating image data, a data control signal, a gate control signal and a touch synchronization signal using an image signal and a plurality of timing signals and generating a plurality of MUX clocks having a MUX slew rate and a MUX clock gap by a timing controlling unit, the MUX slew rate determined such that a vertical stripe figure of merit is close to 0 in a saturation period; generating a data signal using the image data and the data control signal by a data driving unit; outputting the data signal according to the plurality of MUX clocks in a time division by a MUX unit; generating a gate signal using the gate control signal by a gate driving unit; generating a touch transmitting signal using the touch synchronization signal by a touch driving unit; and displaying an image using the gate signal and the data signal and sensing a touch using the touch transmitting signal by a touch display panel.

It is to be understood that both the foregoing general description and the following detailed description are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the invention. In the drawings.

DETAILED DESCRIPTION

Reference will now be made in detail to the present disclosure, examples of which are illustrated in the accompanying drawings.

Figure 4:
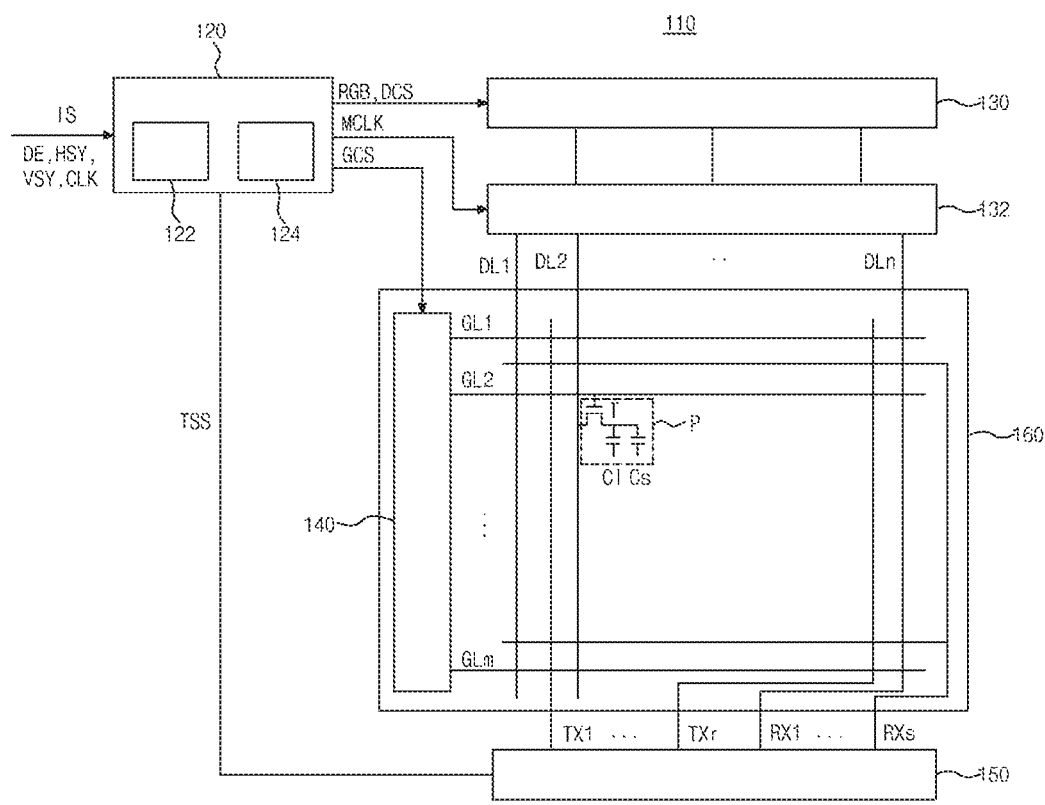
FIG. 4 is a view showing a touch display device according to an embodiment of the present disclosure.
Figure 5:
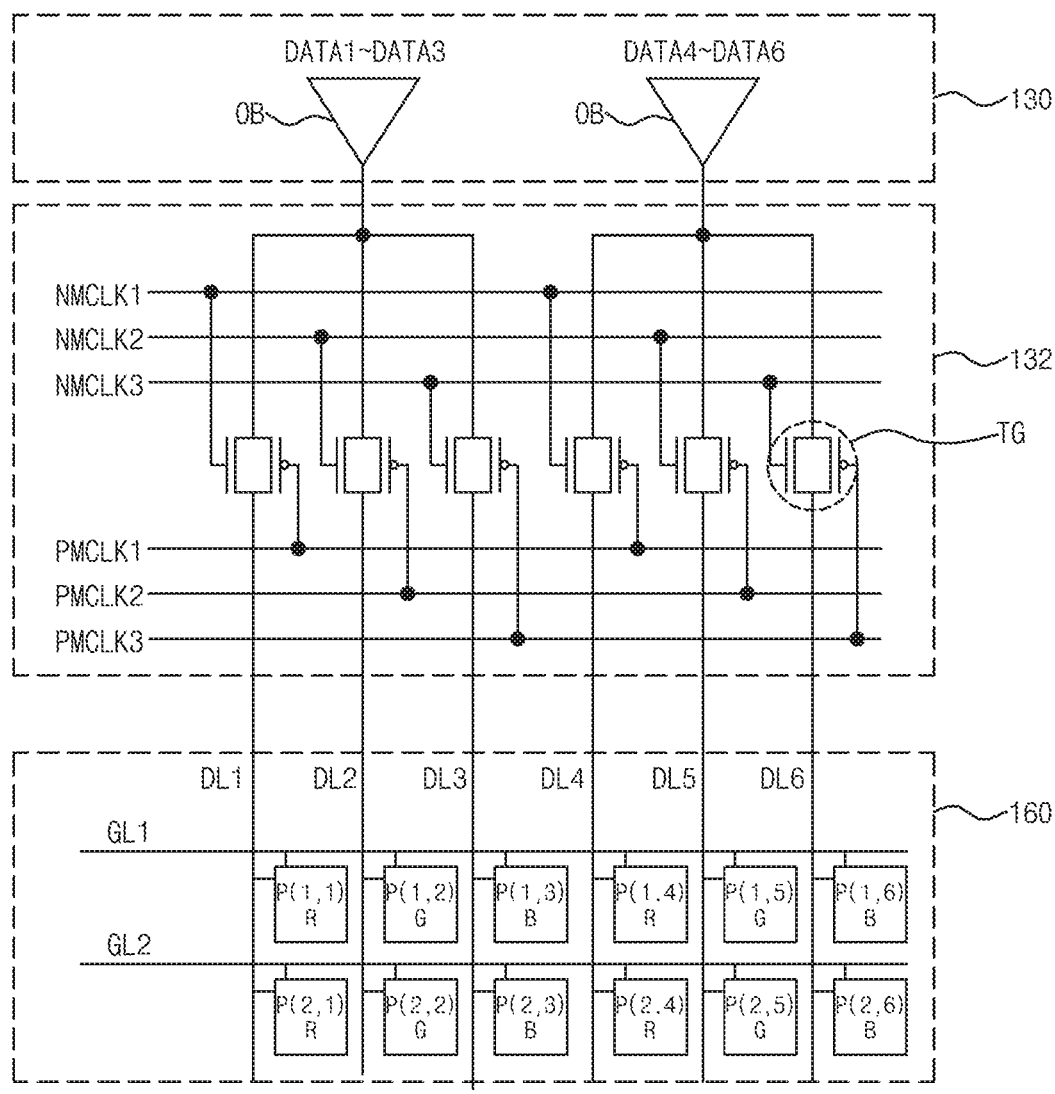
FIG. 5 is a view showing a multiplexer unit of a touch display device according to an embodiment of the present disclosure.
Figure 6:
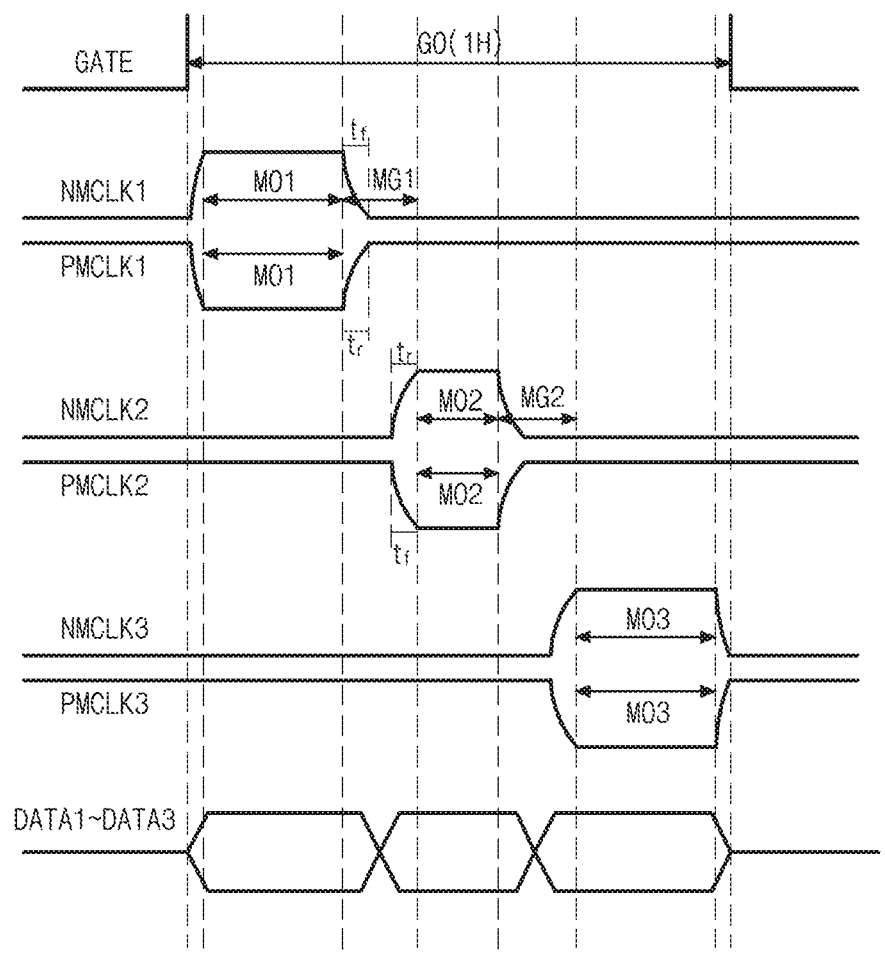
FIG. 6 is a view showing a plurality of multiplexer clocks of a multiplexer unit of a touch display device according to an embodiment of the present disclosure.

FIG. 4 is a view showing a touch display device according to an embodiment of the present disclosure, FIG. 5 is a view showing a multiplexer unit of a touch display device according to an embodiment of the present disclosure, and FIG. 6 is a view showing a plurality of multiplexer clocks of a multiplexer unit of a touch display device according to an embodiment of the present disclosure.

In FIGS. 4 to 6, a touch display device 110 according to an embodiment of the present disclosure includes a timing controlling unit 120, a data driving unit 130, a multiplexer (MUX) unit 132, a gate driving unit 140, a touch driving unit 150 and a touch display panel 160. The touch display device 110 may include an organic light emitting diode (OLED) display device or a liquid crystal display (LCD) device.

The timing controlling unit 120 generates image data RGB, a data control signal DCS, a multiplexer (MUX) clock MCLK, a gate control signal GCS and a touch synchronization signal TSS by using an image signal IS and a plurality of timing signals including a data enable signal DE, a horizontal synchronization signal HSY, a vertical synchronization signal VSY and a clock CLK transmitted from an external system such as a graphic card or a television system. The timing controlling unit 120 transmits the image data RGB and the data control signal DCS to the data driving unit 130, transmits the MUX clock MCLK to the MUX unit 132, transmits the gate control signal GCS to the gate driving unit 140, and transmits the touch synchronization signal TSS to the touch driving unit 150.

For example, the MUX clock MCLK may include first to third negative MUX clocks NMCLK1 to NMCLK3 and first to third positive MUX clocks PMCLK1 to PMCLK3, and the gate control signal may include a gate start signal and a gate clock.

The data driving unit 130 generates a data signal (a data voltage) DATA by using the image data RGB and the data control signal DCS transmitted from the timing controlling unit 120. The data driving unit 130 transmits the data signal to first to nth data lines DL1 to DLn of the touch display panel 160 through the MUX unit 132.

The MUX unit 132 includes a plurality of transmission gates TG which are switched according to the first to third negative MUX clocks NMCLK1 to NMCLK3 and the first to third positive MUX clocks PMCLK1 to PMCLK3.

The data driving unit 130 supplies first to third data signals DATA1 to DATA3 outputted from one digital-analog converter (DAC) and one output buffer OB to three transmission gates TG of the MUX unit 132 and supplies fourth to sixth data signals DATA4 to DATA6 outputted from the other one digital-analog converter (DAC) and the other one output buffer OB to the other three transmission gates TG of the MUX unit 132.

Each of the three transmission gates TG of the MUX unit 132 is turned on by the first to third negative MUX clocks NMCLK1 to NMCLK3 and the first to third positive MUX clocks PMCLK1 to PMCLK3 to transmit the first to third data signals DATA1 to DATA3 to the first to third data lines DL1 to DL3 of the touch display panel 160 in a time division and transmit the fourth to sixth data signals DATA4 to DATA6 to the fourth to sixth data lines DL4 to DL6 of the touch display panel 160 in a time division.

A gate signal GATE has a high level during a gate-on period GO corresponding to one horizontal period 1H so that a thin film transistor (TFT) T connected to the gate line GL can be turned on. The first negative MUX clock NMCLK1 and the first positive MUX clock PMCLK1 have a high level and a low level, respectively, during a first MUX-on section MO1 of the gate-on period GO. The second negative MUX clock NMCLK2 and the second positive MUX clock PMCLK2 have a high level and a low level, respectively, during a second MUX-on section MO2 next to the first MUX-on section MO1 of the gate-on period GO. The third negative MUX clock NMCLK3 and the third positive MUX clock PMCLK3 have a high level and a low level, respectively, during a third MUX-on section MO3 next to the second MUX-on section MO2 of the gate-on period GO.

The first MUX-on section MO1 of the first negative MUX clock NMCLK1 and the first positive MUX clock PMCLK1 and the second MUX-on section MO2 of the second negative MUX clock NMCLK2 and the second positive MUX clock PMCLK2 are separated from each other by a first MUX clock gap MG1, and the second MUX-on section MO2 of the second negative MUX clock NMCLK2 and the second positive MUX clock PMCLK2 and the third MUX-on section MO3 of the third negative MUX clock NMCLK3 and the third positive MUX clock PMCLK3 are separated from each other by a second MUX clock gap MG2.

To minimize reduction of a brightness caused by adjustment of a MUX slew rate, a width of the first MUX-on section MO1 corresponding to a red may be determined to be equal to or greater than a width of the third MUX-on section MO3 corresponding to a blue, and a width of the second MUX-on section MO2 corresponding to a green may be determined to be equal to or smaller than each of the width of the first MUX-on section MO1 and the width of the third MUX-on section MO3. (MO1≥MO3≥MO2)

In addition, to prevent a color mixing, a width of each of the first and second MUX clock gaps MG1 and MG2 of the first to third negative MUX clocks NMCLK1 to NMCLK3 and the first to third positive MUX clocks PMCLK1 to PMCLK3 may be determined to be greater than a sum of a rising time $t_r$ and a falling time $t_f$ of the adjacent MUC clock. (MG1>($t_r$+$t_f$), MG2>($t_r$+$t_f$))

The first to third MUX-on sections MO1 to MO3 and the first and second MUX clock gaps MG1 and MG2 will be illustrated with reference to FIG. 7.

Although the MUX unit 132 exemplarily uses three pairs of MUX clocks (NMCLK1 to NMCLK3. PMCLK1 to PMCLK3) in the embodiment of FIGS. 5 and 6, the MUX unit may use six pairs of MUX clocks or the other pairs of MUX clocks in another embodiment. Alternatively, the MUX unit may use three or more MUX clocks in another embodiment. In addition, the MUX unit may include a negative type transistor or a positive type transistor instead of the transmission gate TG in another embodiment.

Although the MUX unit 132 and the data driving unit 130 are independently disposed in the embodiment of FIGS. 4 and 5, the MUX unit may be integrated in the data driving unit in another embodiment.

The gate driving unit 140 generates a gate signal (a gate voltage) GATE by using the gate control signal GCS transmitted from the timing controlling unit 120 and transmits the gate signal GATE to first to mth gate lines GL1 to GLm of the touch display panel 160.

The gate driving unit 140 may have a gate-in-panel (GIP) type where the gate driving unit 140 is integrated on a substrate of the touch display panel 160 with the first to mth gate lines GL1 to GLm, the first to nth data lines DL1 to DLn and a pixel P. The gate driving unit 140 may be disposed in at least one of right and left edge portions of the touch display panel 160.

The gate driving unit 140 of a GIP type may include a shift register including a plurality of stages each generating the plurality of gate signals GATE by using a gate start signal GSP and a gate clock GCLK. The plurality of stages of the shift register may be connected to each other in a cascade type where an output voltage of the present stage is inputted to the next stage, and may include a plurality of transistors formed through the same process as the TFT T of the pixel P.

The touch driving unit 150 generates a touch transmitting signal (a touch transmitting signal) by using the touch synchronization signal TSS transmitted from the timing controlling unit 120. The touch driving unit 150 transmits the touch transmitting signal to first to rth touch transmitting lines TX1 to TXr of the touch display panel 160 and reads a touch receiving signal (a touch receiving voltage) from first to sth touch receiving lines RX1 to RXs of the touch display panel 160.

Although the touch driving unit 150, the timing controlling unit 120 and the data driving unit 130 are independently disposed in the embodiment of FIG. 4, the touch driving unit 150 may be integrated in the timing controlling unit 120 or the data driving unit 130 in another embodiment.

The touch display panel 160 displays an image by using the data signal DATA and the gate signal GATE and senses a touch by using the touch transmitting signal and the touch receiving signal. The touch display panel 160 includes the first to mth gate lines GL1 to GLm, the first to nth data lines DL1 to DLn, the first to rth touch transmitting lines TX1 to TXr parallel to the first to nth data lines DL1 to DLn and the first to sth touch receiving lines RX1 to RXs parallel to the first to mth gate lines GL1 to GLm. Each pixel P includes the TFT T connected to the first to mth gate lines GL1 to GLm and the first to nth data lines DL1 to DLn and a liquid crystal capacitor Cl and a storage capacitor Cs connected to the TFT T.

In another embodiment where the touch display device 110 is an organic light emitting diode (OLED) display device, the pixel P of the touch display panel 160 may include a switching TFT, a driving TFT, a storage capacitor and a light emitting diode.

In the touch display device 110, the gate signal GATE of the high level is supplied to the first gate line GL1 and the TFT T of the pixels P of a first horizontal line corresponding to the first gate line GL1 is turned on during the gate-on period GO. During the first MUX-on section MO1 of the first negative MUX clock NMCLK1 and the first positive MUX clock PMCLK1 in the gate-on period GO, the corresponding transmission gate TG of the MUX unit 132 is turned on and the data signal DATA is supplied to the first, fourth, seventh, . . . , (n−2)th data lines DL1, DL4, DL7, DL(n−2) to be applied to the (1,1), (1,4), (1,7), . . . , (1,n−2) pixels P(1,1), P(1,4), P(1,7), . . . , P(1,n−2) displaying a red (R). During the second MUX-on section MO2 of the second negative MUX clock NMCLK2 and the second positive MUX clock PMCLK2 in the gate-on period GO, the corresponding transmission gate TG of the MUX unit 132 is turned on and the data signal DATA is supplied to the second, fifth, eighth, . . . , (n−1)th data lines DL2, DL5, DL8, DL(n−1) to be applied to the (1,2), (1,5), (1,8), . . . , (1,n−1) pixels P(1,2), P(1,5), P(1,8), . . . , P(1,n−1) displaying a green (G). During the third MUX-on section MO3 of the third negative MUX clock NMCLK3 and the third positive MUX clock PMCLK3 in the gate-on period GO, the corresponding transmission gate TG of the MUX unit 132 is turned on and the data signal DATA is supplied to the third, sixth, ninth, . . . , nth data lines DL3, DL6, DL9, DLn to be applied to the (1,3), (1,6), (1,9), . . . , (1,n) pixels P(1,3), P(1,6), P(1,9), . . . , P(1,n) displaying a blue (B).

Next, the gate signal GATE of the high level is supplied to the second gate line GL2 and the TFT T of the pixels P of a second horizontal line corresponding to the second gate line GL2 is turned on during the gate-on period GO. During the first MUX-on section MO1 of the first negative MUX clock NMCLK1 and the first positive MUX clock PMCLK1 in the gate-on period GO, the corresponding transmission gate TG of the MUX unit 132 is turned on and the data signal DATA is supplied to the first, fourth, seventh, . . . , (n−2)th data lines DL1, DL4, DL7, DL(n−2) to be applied to the (2,1), (2,4), (2,7), . . . , (2,n−2) pixels P(2,1), P(2,4), P(2,7), . . . , P(2,n−2) displaying a red (R). During the second MUX-on section MO2 of the second negative MUX clock NMCLK2 and the second positive MUX clock PMCLK2 in the gate-on period GO, the corresponding transmission gate TG of the MUX unit 132 is turned on and the data signal DATA is supplied to the second, fifth, eighth, . . . , (n−1)th data lines DL2, DL5, DL8, DL(n−1) to be applied to the (2,2), (2,5), (2,8), . . . , (2,n−1) pixels P(2,2), P(2,5), P(2,8), . . . , P(2,n−1) displaying a green (G). During the third MUX-on section MO3 of the third negative MUX clock NMCLK3 and the third positive MUX clock PMCLK3 in the gate-on period GO, the corresponding transmission gate TG of the MUX unit 132 is turned on and the data signal DATA is supplied to the third, sixth, ninth, . . . , nth data lines DL3, DL6, DL9, DLn to be applied to the (2,3), (2,6), (2,9), . . . , (2,n) pixels P(2,3), P(2,6), P(2,9), . . . , P(2,n) displaying a blue (B).

Similarly, the data signal DATA is sequentially applied to the pixels P corresponding the third to mth gate lines GL3 to GLm to display an image.

In the touch display device 110, a time period of one frame is divided into a display period for displaying an image and a touch period for sensing a touch. During the display period, the common voltage is applied to the first to rth touch transmitting lines TX1 to TXr and the first to sth touch receiving lines RX1 to RXs. During the touch period, the touch transmitting voltage is applied to the first to rth touch transmitting lines TX1 to TXr and a voltage of the first to sth touch receiving lines RX1 to RXs is read out. A parasitic capacitance is generated between the first to nth data lines DL1 to DLn and the first to rth touch transmitting lines TX1 to TXr and between the first to nth data lines DL1 to DLn and the first to sth touch receiving lines RX1 to RXs. As a result, a deviation may be generated in the common voltage of the first to rth touch transmitting lines TX1 to TXr and the first to sth touch receiving lines RX1 to RXs due to a coupling of the data signal (the data voltage) of the first to nth data lines DL1 to DLn through the parasitic capacitance, and deterioration such as a stripe stain of a linear shape may be caused by the deviation in the common voltage.

In the touch display device 110 according to the embodiment of the present disclosure, the deviation of the common voltage caused by the coupling of the data signal DATA through the parasitic capacitance is minimized by adjusting the MUX slew rate of the MUX clock MCLK, which determines a timing of a voltage variation by adjusting an output of the data signal DATA of the first to nth data lines DL1 to DLn. As a result, deterioration such as a stripe stain is prevented.

The timing controlling unit 120 adjusts the MUX slew rate of the first to third negative MUX clocks NMCLK1 to NMCLK3 and the first to third positive MUX clocks PMCLK1 to PMCLK3 as well as the gate clock gap and the gate slew rate of the gate clock. The timing controlling unit 120 includes a slew rate adjusting part 122 and a clock gap adjusting part 124.

The slew rate adjusting part 122 adjusts the gate slew rate of the gate clock GCLK and the MUX slew rate of the first to third negative MUX clocks NMCLK1 to NMCLK3 and the first to third positive MUX clocks PMCLK1 to PMCLK3 by changing the rising time and the falling time of the gate clock GCLK, the first to third negative MUX clocks NMCLK1 to NMCLK3 and the first to third positive MUX clocks PMCLK1 to PMCLK3.

For example, the slew rate adjusting part 122 may include a high terminal where a high source voltage of a high level is supplied, a low terminal where a low source voltage of a low level is supplied, an output terminal where the gate clock GCLK, the first to third negative MUX clocks NMCLK1 to NMCLK3 and the first to third positive MUX clocks PMCLK1 to PMCLK3 are outputted, a first variable resistor whose one end is connected to the high terminal, a first transistor which is switched according to a first voltage and is connected between the other end of the first variable resistor and the output terminal, a second variable resistor whose one end is connected to the low terminal and a second transistor which is switched according to a second voltage and is connected between the other end of the second variable resistor and the output terminal. The slew rate adjusting part 122 may output the gate clock GCLK whose gate slew rate is adjusted and the first to third negative MUX clocks NMCLK1 to NMCLK3 and the first to third positive MUX clocks PMCLK1 to PMCLK3 whose MUX slew rate is adjusted by changing a time constant (t=RC) according to the first and second variable resistors.

The clock gap adjusting part 124 adjusts a gate clock gap GG of the gate clock GCLK and a MUX clock gap MG of the first to third negative MUX clocks NMCLK1 to NMCLK3 and the first to third positive MUX clocks PMCLK1 to PMCLK3. For example, the clock gap adjusting part 124 may include a delay circuit.

A variation of the MUX slew rate of the MUX clock of the touch display device 110 and a variation of a vertical stripe feature of merit (VSFOM) will be illustrated hereinafter.

Figure 7:
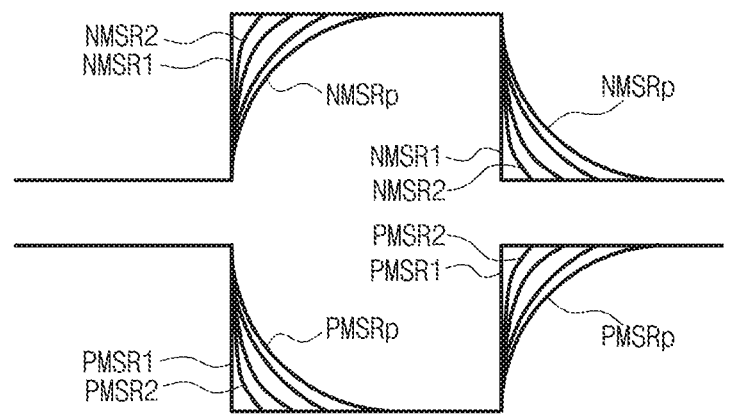
FIG. 7 is a view showing a change of a multiplexer slew rate of a multiplexer clock of a touch display device according to an embodiment of the present disclosure.
Figure 8:
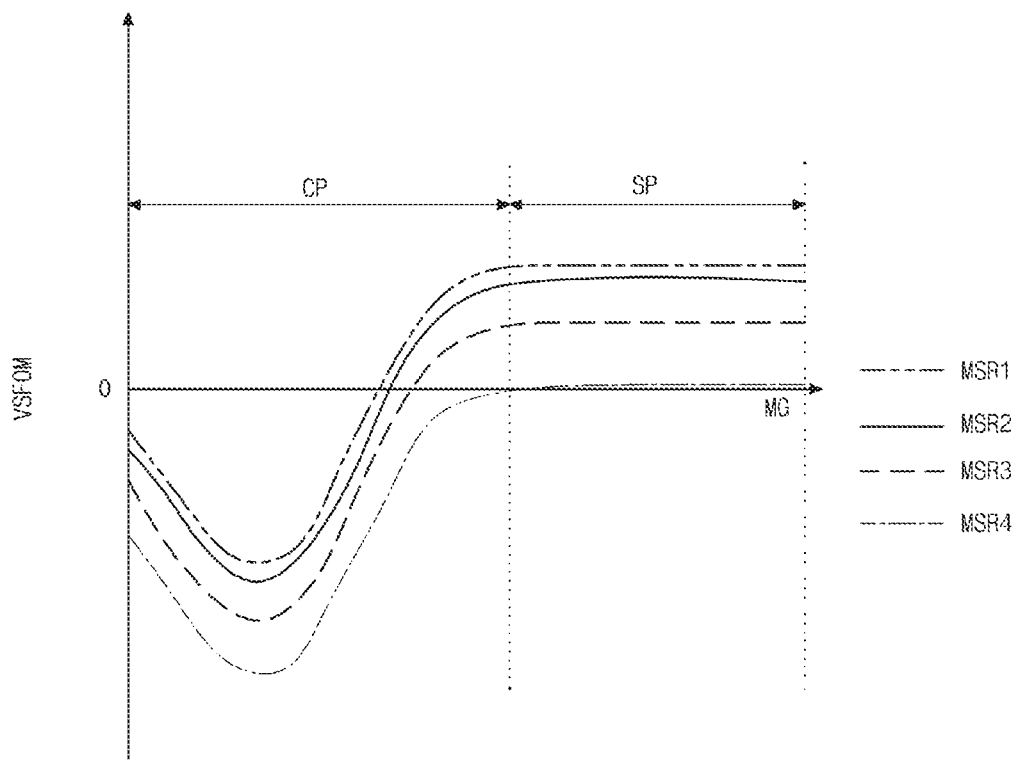
FIG. 8 is a view showing a vertical stripe feature of merit of a touch display device according to an embodiment of the present disclosure.

FIG. 7 is a view showing a change of a multiplexer slew rate of a multiplexer clock of a touch display device according to an embodiment of the present disclosure, and FIG. 8 is a view showing a vertical stripe feature of merit of a touch display device according to an embodiment of the present disclosure. Reference is made to FIGS. 4 to 6 with FIGS. 7 and 8.

In FIG. 7, each of the first to third negative MUX clocks NMCLK1 to NMCLK3 of the touch display device 110 according to an embodiment of the present disclosure may have first to pth negative slew rates NMSR1 to NMSRp and first to pth positive slew rates PMSR1 to PMSRp according to a rising time $t_r$ and a falling time $t_f$. The slew rate may be defined as a ratio of a voltage variation to a time variation.

For example, the first negative MUX slew rate NMSR1 and the positive MUX slew rate PMSR1 of the rising time $t_r$ and the falling time $t_f$ of 0 correspond to an infinity. As the rising time $t_r$ and the falling time $t_f$ increase, the negative MUX slew rate decreases from the second negative MUX slew rate NMSR2 to the pth negative MUX slew rate NMSRp and the positive MUX slew rate decreases from the second positive MUX slew rate PMSR2 to the pth positive MUX slew rate PMSRp.

Figure 1:
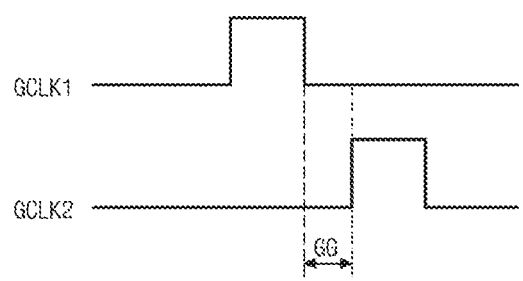
FIG. 1 is a view showing a gate clock of a touch display device according to the related art.
Figure 2:
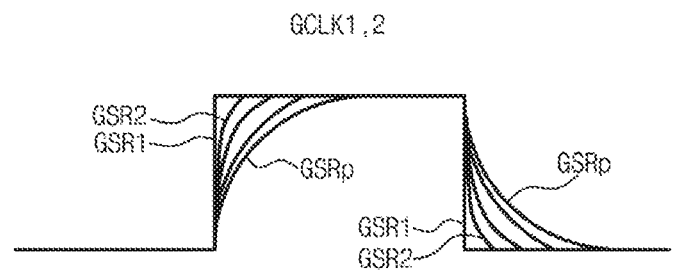
FIG. 2 is a view showing a change of a gate slew rate of a gate clock of a touch display device according to the related art.
Figure 3:
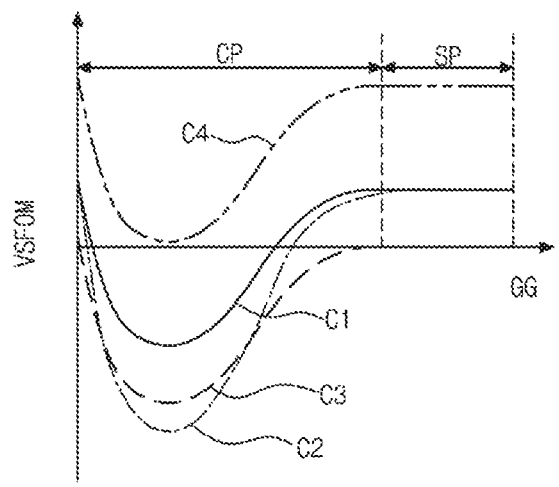
FIG. 3 is a view showing a vertical stripe feature of merit of a touch display device according to the related art.

When the gate slew rate of the first and second gate clocks GCLK1 and GCLK2 is not adjusted, a vertical stripe feature of merit (VSFOM) of the touch display device 110 is changed according to a first curve C1 (of FIG. 3) with respect to a gate clock gap GG of the first and second gate clocks GCLK1 and GCLK2. During a change period CP, the VSFOM decreases and then increases as the gate clock gap GG of the first and second gate clocks GCLK1 and GCLK2 increases. During a saturation period SP, the VSFOM is kept constant even when the gate clock gap GG of the first and second gate clocks GCLK1 and GCLK2 increases.

As a result, deterioration such as a stripe stain of the touch display device is prevented by adjusting the gate clock gap GG of the first and second gate clocks GCLK1 and GCLK2 such that the VSFOM becomes 0 in the change period CP.

However, when the touch display device 110 is used for a relatively long time, the VSFOM is changed according to a second curve C2 (of FIG. 3) with respect to the gate clock gap GG of the first and second gate clocks GCLK1 and GCLK2. Since the gate clock gap GG of the first and second gate clocks GCLK1 and GCLK2 for the VSFOM of 0 in the change period CP is changed, deterioration such as a stripe stain may be caused again.

However, in the saturation period SP, the VSFOM is kept constant even when the gate clock gap GG of the first and second gate clocks GCLK1 and GCLK2 increases.

When the gate slew rate of the first and second gate clocks GCLK1 and GCLK2 is adjusted, the VSFOM is changed according to a third curve C3 (of FIG. 3) which is obtained through a parallel movement of the first curve C1 with respect to the gate clock gap GG of the first and second gate clocks GCLK1 and GCLK2. When the gate clock gap GG of the first and second gate clocks GCLK1 and GCLK2 is determined to correspond to the saturation period SP of the third curve C3, the VSFOM may be kept 0 at a beginning of usage and even after usage for a relatively long time. As a result, deterioration such as a stripe stain is prevented.

In FIG. 8, as the MUX slew rate of the first to third negative MUX clocks NMCLK1 to NMCLK3 and the first to third positive MUX clocks PMCLK1 to PMCLK3 increases, the curve of the VSFOM with respect to the MUX clock gap MG of the touch display device 110 moves in parallel (parallel shift) from a first MUX slew rate curve MSR1 to a fourth MUX slew rate curve MSR4.

For example, the VSFOM corresponding to the first to third negative MUX clocks NMCLK1 to NMCLK3 and the first to third positive MUX clocks PMCLK1 to PMCLK3 of a first slew rate may be changed according to a first MUX slew rate curve MSR1 with respect to the MUX clock gap MG, and the VSFOM corresponding to the first to third negative MUX clocks NMCLK1 to NMCLK3 and the first to third positive MUX clocks PMCLK1 to PMCLK3 of a second slew rate smaller (slower) than the first slew rate may be changed according to a second MUX slew rate curve MSR2 with respect to the MUX clock gap MG which is obtained through a parallel movement of the first MUX slew rate curve MSR1 toward a negative direction (downward).

The VSFOM corresponding to the first to third negative MUX clocks NMCLK1 to NMCLK3 and the first to third positive MUX clocks PMCLK1 to PMCLK3 of a third slew rate smaller (slower) than the second slew rate may be changed according to a third MUX slew rate curve MSR3 with respect to the MUX clock gap MG which is obtained through a parallel movement of the second MUX slew rate curve MSR2 toward a negative direction (downward), and the VSFOM corresponding to the first to third negative MUX clocks NMCLK1 to NMCLK3 and the first to third positive MUX clocks PMCLK1 to PMCLK3 of a fourth slew rate smaller (slower) than the third slew rate may be changed according to a fourth MUX slew rate curve MSR4 with respect to the MUX clock gap MG which is obtained through a parallel movement of the third MUX slew rate curve MSR3 toward a negative direction (downward).

Each of the first to fourth MUX slew rate curves MSR1 to MSR4 includes a change period CP and a saturation period SP. During the change period CP, the VSFOM decreases and then increases as the MUX clock gap MG of the first to third negative MUX clocks NMCLK1 to NMCLK3 and the first to third positive MUX clocks PMCLK1 to PMCLK3 increases. During a saturation period SP, the VSFOM is kept constant even when the MUX clock gap MG of the first to third negative MUX clocks NMCLK1 to NMCLK3 and the first to third positive MUX clocks PMCLK1 to PMCLK3 increases.

As a result, deterioration such as a stripe stain of the touch display device 110 is prevented by adjusting the MUX slew rate of the first to third negative MUX clocks NMCLK1 to NMCLK3 and the first to third positive MUX clocks PMCLK1 to PMCLK3 such that the VSFOM becomes 0 in the saturation period SP.

Specifically, since the VSFOM is kept a constant value of 0 in the saturation period SP even after the touch display device 110 is used for a relatively long time, deterioration such as a stripe stain is prevented.

For example, the VSFOM of the touch display device 110 may be changed according to the fourth MUX slew rate curve MSR4 which is obtained through a parallel movement of about −237 of the first MUX slew rate curve MSR1 by reducing the MUX slew rate of the first to third negative MUX clocks NMCLK1 to NMCLK3 and the first to third positive MUX clocks PMCLK1 to PMCLK3.

When the MUX slew rate is reduced by increasing the rising time $t_r$ and the falling time $t_f$ of the first to third negative MUX clocks NMCLK1 to NMCLK3 and the first to third positive MUX clocks PCLK1 to PCLK3 in the gate-on period GO corresponding to one horizontal period 1H, the rising time $t_r$ and the falling time $t_f$ of the adjacent MUX clocks overlap each other to cause a color mixing.

In FIG. 6, when the rising time $t_r$ and the falling time $t_f$ of the first negative MUX clock NMCLK1 and the second negative MUX clock NMCLK2 overlap each other by increasing the falling time $t_f$ of the first negative MUX clock NMCLK1 and the rising time $t_r$ of the second negative MUX clock NMCLK2, the data signal corresponding to a red and the data signal corresponding to a green may be mixed to be applied to the (1,1) pixel P(1,1) and the (1,2) pixel P(1,2). As a result, the brightness of the image displayed by the touch display device 110 may be reduced.

To prevent the color mixing, a width of the first MUX clock gap MG1 between the first and second negative MUX clocks MCLK1 and MCLK2 may be determined to be greater than a sum of the falling time $t_f$ of the first negative MUX clock MCLK1 and the rising time $t_r$ of the second negative MUX clock NMCLK2. (MG1>($t_r$+$t_f$), MG2>($t_r$+$t_f$))

Since a width of the gate-on period GO is limited to one horizontal period 1H, an insufficient time may be assigned to the first to third MUX-on periods MO1 to MO3.

Accordingly, the width of the second MUX-on period MO2 corresponding to a green having a brightness greater than a red and a blue is most reduced so that the width of the second MUX-on period MO2 can be smaller than each of the widths of the first and third MUX-on periods MO1 and MO3. (MO2<MO1, MO2<MO3)

When the assigned time is further insufficient, the width of the third MUX-on period MO3 corresponding to a blue having a brightness greater than a red is reduced so that the width of the third MUX-on period MO3 can be equal to or smaller than the width of the first MUX-on period MO1. (MO3≤MO1)

Consequently, in the touch display device 110 according to an embodiment of the present disclosure, the gate slew rate of the gate clock GCLK and the MUX slew rate of the MUX clock MCLK are adjusted by the slew rate adjusting part 122, and the gate clock gap GG of the gate clock GCLK and the MUX clock gap MG of the MUX clock MCLK are adjusted by the clock gap adjusting part 124. As a result, the vertical stripe figure of merit (VSFOM) is minimized, the brightness uniformity is improved, the deterioration such as a stripe stain is prevented, and the brightness reduction due to the adjustment of the slew rate is minimized.

It will be apparent to those skilled in the art that various modifications and variation can be made in the present disclosure without departing from the spirit or scope of the invention. Thus, it is intended that the present disclosure cover the modifications and variations of this disclosure provided they come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device, comprising:
a timing controlling unit generating image data, a data control signal, a gate control signal and a touch synchronization signal by using an image signal and a plurality of timing signals and generating a plurality of multiplexer (MUX) clocks having a MUX slew rate and a MUX clock gap;
a data driving unit generating a data signal by using the image data and the data control signal;
a MUX unit outputting the data signal according to the plurality of MUX clocks in a time division;

a gate driving unit generating a gate signal by using the gate control signal;

a touch driving unit generating a touch transmitting signal by using the touch synchronization signal; and a touch display panel displaying an image by using the gate signal and the data signal and sensing a touch by using the touch transmitting signal, wherein the plurality of MUX clocks include a plurality of negative MUX clocks and a plurality of positive MUX clocks, and wherein the MUX unit includes a plurality of transmission gates switched according to the plurality of negative MUX clocks and the plurality of positive MUX clocks.

2. The touch display device of claim 1, wherein the MUX slew rate is determined such that a vertical stripe figure of merit of the touch display panel is close to 0 in a saturation period.

3. The touch display device of claim 1, wherein the touch display panel comprises:

a plurality of gate lines where the gate signal is applied;

a plurality of data lines where the data signal is applied, the plurality of data lines and the plurality of gate lines crossing each other to define a plurality of pixels;

a plurality of touch transmitting lines where a common voltage is supplied during a display period of one frame and the touch transmitting signal is supplied during a touch period of one frame; and a plurality of touch receiving lines where the common voltage is applied during the display period of one frame and a touch receiving signal is outputted during the touch period of one frame.

4. The touch display device of claim 3, wherein the plurality of pixels include first, second and third pixels displaying red, green and blue, respectively, wherein the plurality of data lines include first, second and third data lines connected to the first, second and third pixels, respectively, wherein the plurality of MUX clocks include first, second and third MUX clocks corresponding to timings where the data signal is supplied to the first, second and third data lines, respectively, and wherein a width of a first MUX-on period of the first MUX clock is equal to or greater than a width of a third MUX-on period of the third MUX clock, and a width of the third MUX-on period of the third MUX clock is greater than a width of a second MUX-on period of the second MUX clock.

5. The touch display device of claim 4, wherein a first MUX clock gap between the first and second MUX clocks is greater than a sum of a falling time of the first MUX clock and a rising time of the second MUX clock, and wherein a second MUX clock gap between the second and third MUX clocks is greater than a sum of a falling time of the second MUX clock and a rising time of the third MUX clock.

6. The touch display device of claim 1, wherein the timing controlling unit comprises:

a slew rate adjusting part adjusting a gate slew rate of a plurality of gate clocks of the gate control signal and the MUX slew rate of the plurality of MUX clocks; and a clock gap adjusting part adjusting a gate clock gap of the plurality of gate clocks and the MUX clock gap of the plurality of MUX clocks.

7. The touch display device of claim 6, wherein the gate clock gap is determined such that a vertical stripe figure of merit of the touch display panel is disposed in a saturation period, and wherein the gate slew rate is determined such that the vertical stripe figure of merit of the touch display panel is close to 0 in the saturation period.

8. A method of driving a touch display device, comprising:

generating image data, a data control signal, a gate control signal and a touch synchronization signal using an image signal and a plurality of timing signals and generating a plurality of MUX clocks having a MUX slew rate and a MUX clock gap by a timing controlling unit, the MUX slew rate determined such that a vertical stripe figure of merit is close to 0 in a saturation period;

generating a data signal using the image data and the data control signal by a data driving unit;

outputting the data signal according to the plurality of MUX clocks in a time division by a MUX unit;

generating a gate signal using the gate control signal by a gate driving unit;

generating a touch transmitting signal using the touch synchronization signal by a touch driving unit; and displaying an image using the gate signal and the data signal and sensing a touch using the touch transmitting signal by a touch display panel, wherein the plurality of MUX clocks include a plurality of negative MUX clocks and a plurality of positive MUX clocks, and wherein the MUX unit includes a plurality of transmission gates switched according to the plurality of negative MUX clocks and the plurality of positive MUX clocks.

9. The method of claim 8, wherein generating the gate control signal and the plurality of MUX clocks by the timing controlling unit comprises:

determining the MUX clock gap such that a rising time and a falling time of adjacent two of the plurality of MUX clocks are separated from each other; and determining a gate clock gap of a plurality of gate clocks of the gate control signal such that a vertical stripe figure of merit is disposed in a saturation period.

* * * * *